Figure 1:
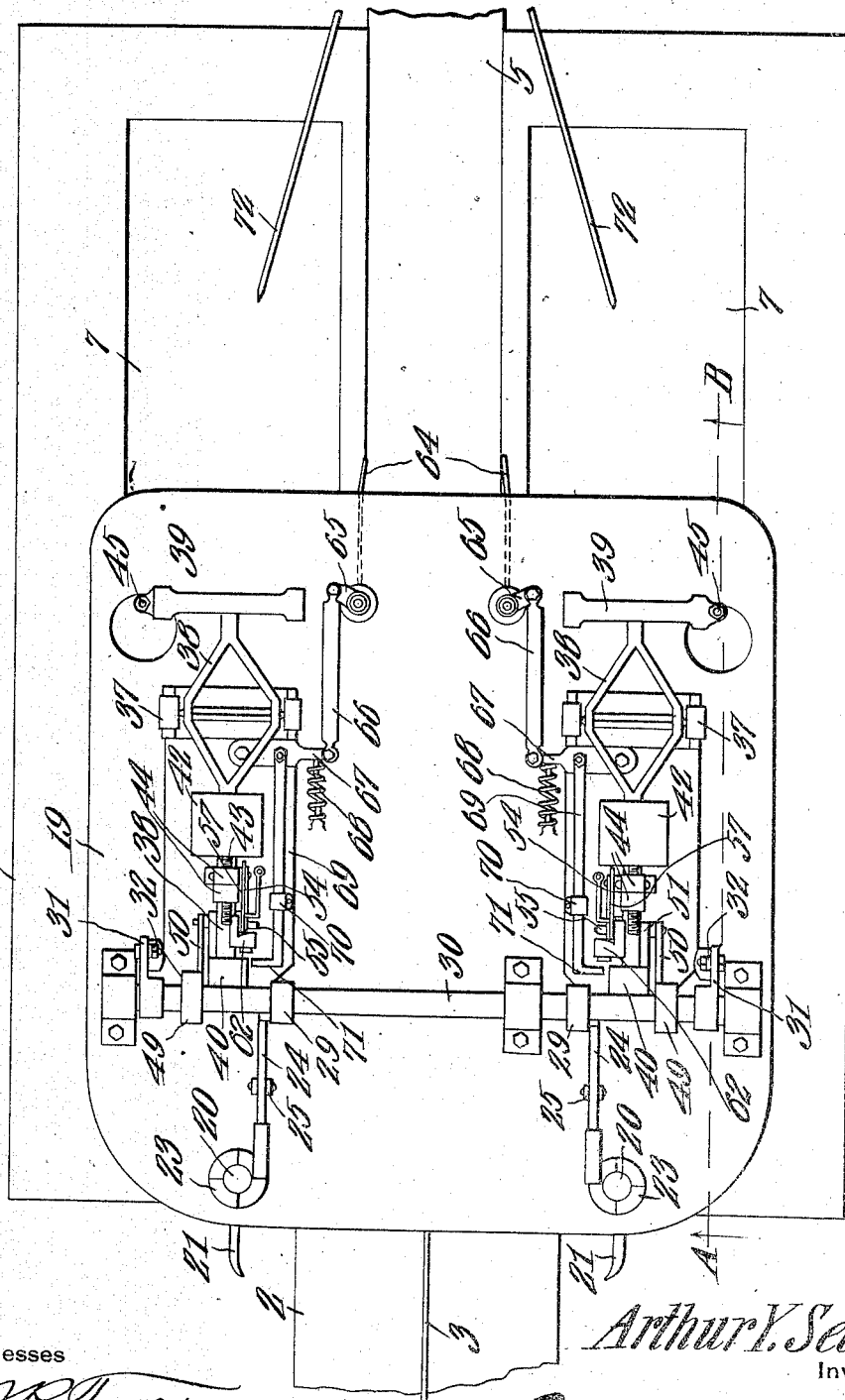

A. Y. SEELY.
CAN WEIGHING MACHINE.
APPLICATION FILED OCT. 29, 1914.

1,182,221.

Patented May 9, 1916.
6 SHEETS—SHEET 1.

Witnesses

Arthur Y. Seely,
Inventor by
Attorney

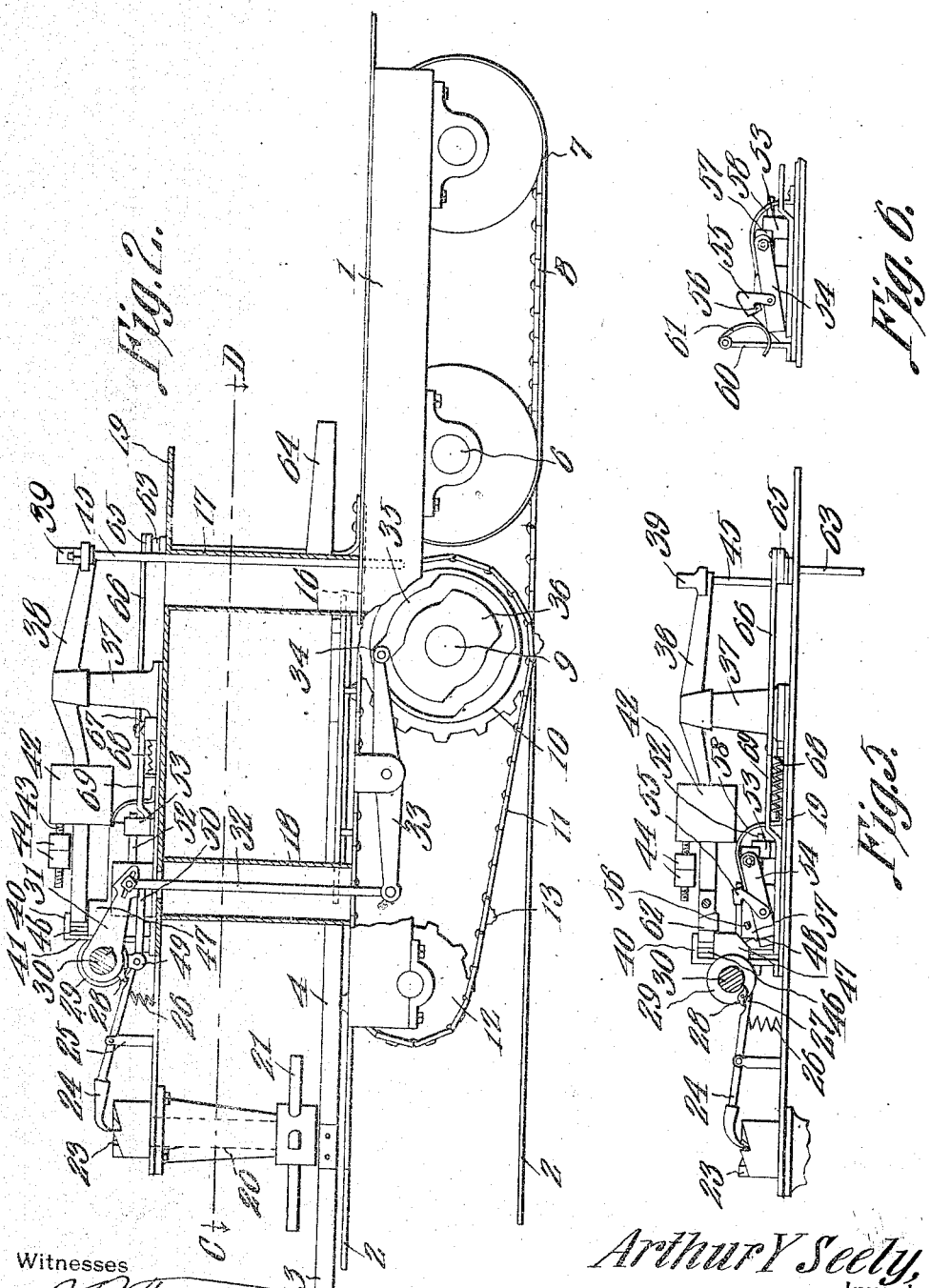

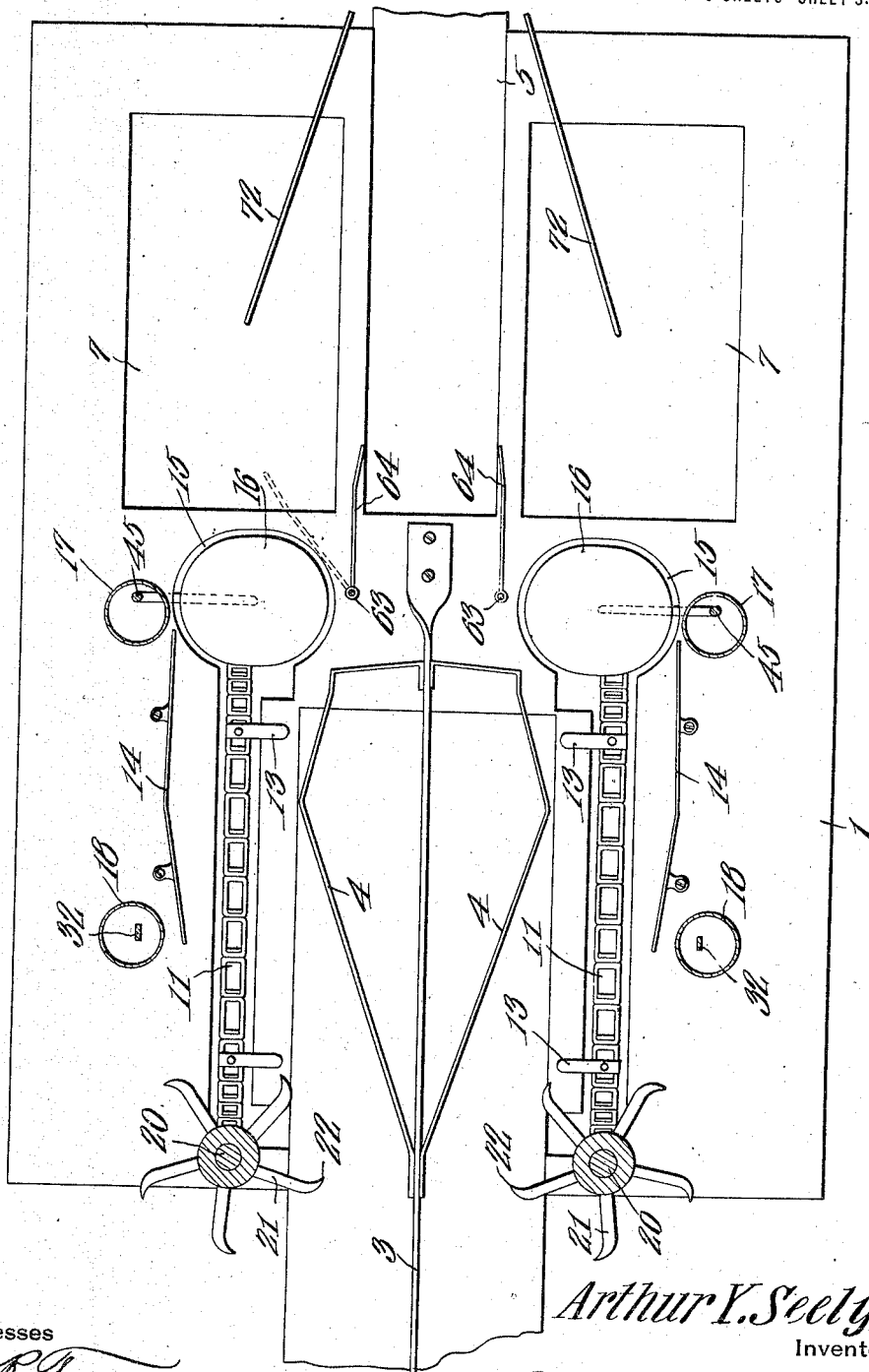

A. Y. SEELY.
CAN WEIGHING MACHINE.
APPLICATION FILED OCT. 29, 1914.
1,182,221.
Patented May 9, 1916.
6 SHEETS—SHEET 4.
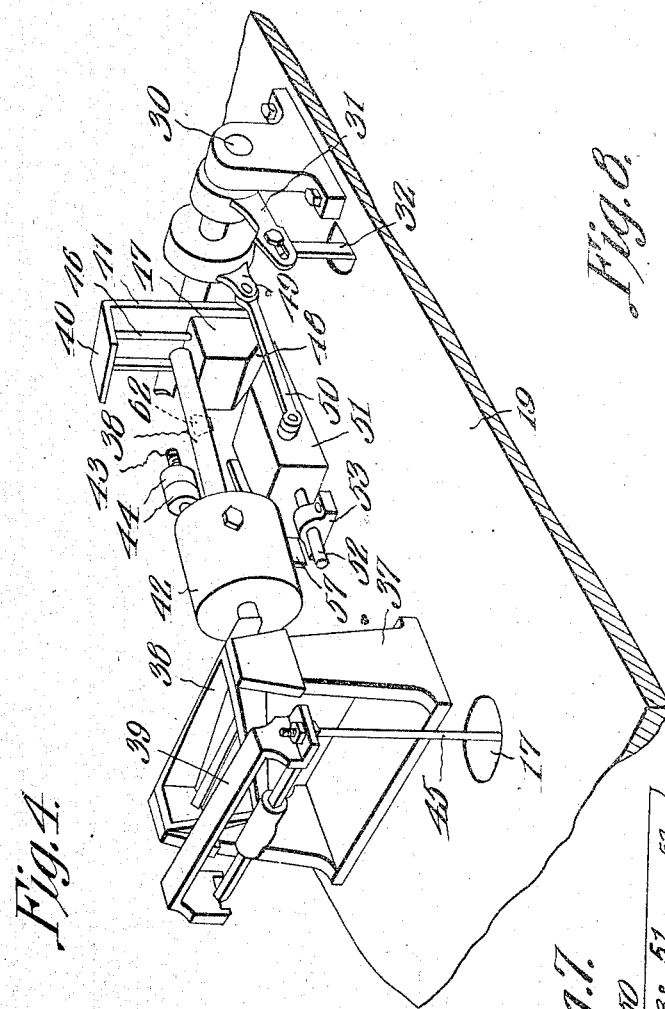
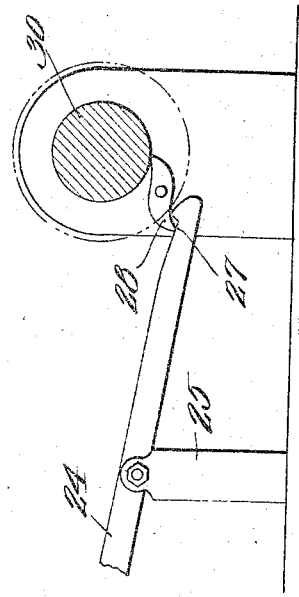
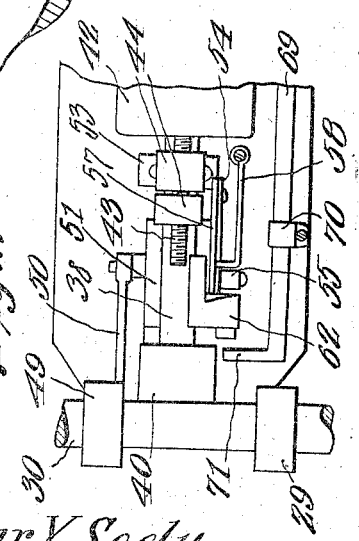
Witnesses
Arthur Y. Seely, Inventor
by C. A. Snow & Co.
Attorneys

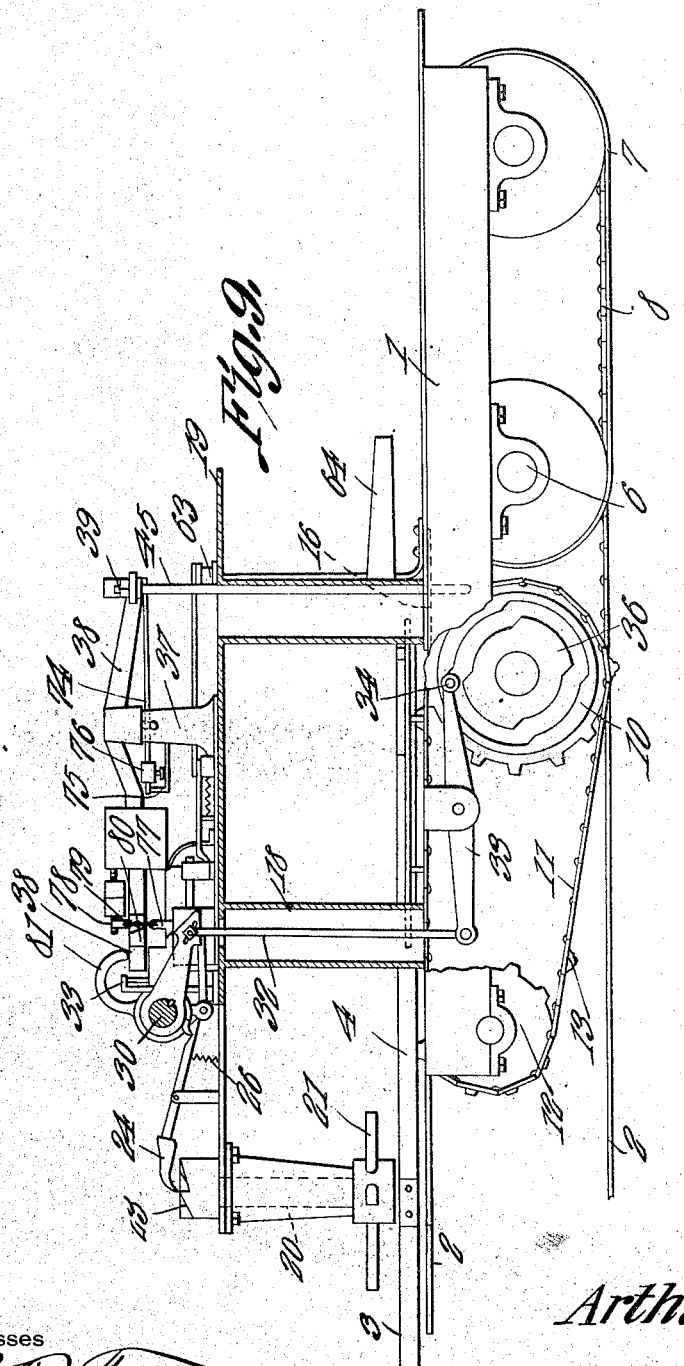

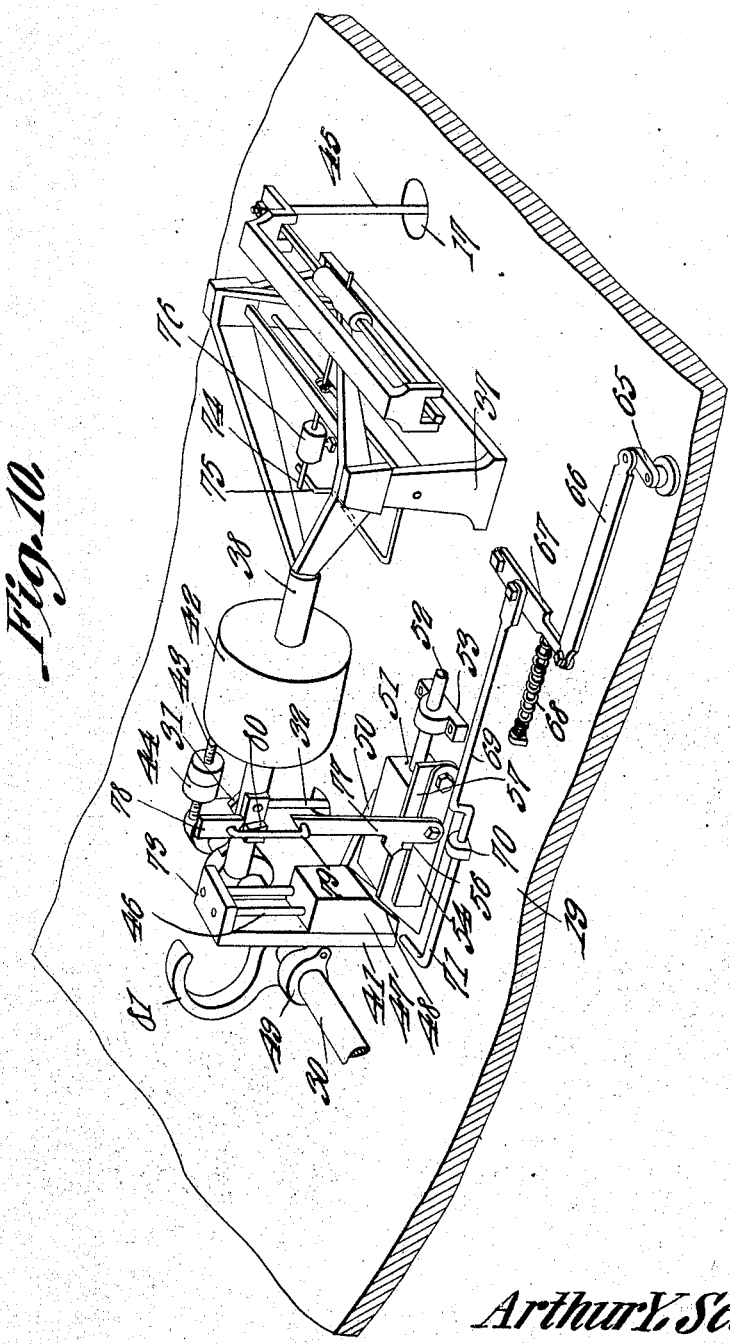

UNITED STATES PATENT OFFICE.

ARTHUR Y. SEELY, OF BLAINE, WASHINGTON.

CAN-WEIGHING MACHINE.

1,182,221.　　　　Specification of Letters Patent.　　　Patented May 9, 1916.

Application filed October 29, 1914. Serial No. 869,290.

*To all whom it may concern:*

Be it known that I, ARTHUR Y. SEELY, a citizen of the United States, residing at Blaine, in the county of Whatcom and State of Washington, have invented a new and useful Can-Weighing Machine, of which the following is a specification.

This invention relates to machines for weighing cans after they have been filled, one of the objects of the invention being to provide mechanism which will operate automatically to weigh the cans as they are fed thereto and to discard all cans of less or more than a predetermined weight.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a top plan view of the machine, those portions of the feeding and discharging belts remote from the weighing and discarding mechanism being removed. Fig. 2 is a section through the weighing mechanism on line A—B Fig. 1, certain of the parts being shown in elevation. Fig. 3 is a section on line C—D Fig. 2. Fig. 4 is a perspective view of a portion of the weighing mechanism. Fig. 5 is a side elevation partly in section of a portion of the weighing mechanism and showing the parts shifted to the positions assumed thereby during the actuation of the deflecting finger or switch. Fig. 6 is a side elevation of a portion of the said weighing mechanism and showing the relative positions of the parts when uncoupled from the deflecting finger or switch. Fig. 7 is an enlarged plan view of a portion of the scale mechanism. Fig. 8 is an enlarged detail view of the ratchet engaging dog and its trip, the parts being shown in the positions assumed thereby during the disengagement of the dog from the ratchet. Fig. 9 is a view similar to Fig. 2 but showing the structure modified so as to discard cans that are overweight as well as those that are underweight. Fig. 10 is a perspective view of a portion of the modified mechanism.

Referring to the figures by characters of reference 1 designates a table into which extends an endless feed belt 2 above which belt is arranged an upstanding longitudinal partition 3 from which diverge deflecting members 4. Belt 2 is spaced from but disposed in alinement with a delivering belt 5 adapted to be driven by a shaft 6 and this shaft is also adapted to drive endless side belts 7 located close to and parallel with the belt 5. The shaft 6 can be actuated in any preferred manner, as by means of a chain 8 receiving motion from a suitably disposed sprocket on the main drive shaft 9 of the machine. This drive shaft is also provided with a sprocket 10 adapted to transmit motion to an endless conveyer chain 11 located at one side of the feed belt 2, this conveyer chain engaging an idler sprocket 12 and being provided, at regular intervals, with projections 13 preferably in the form of fingers extending outwardly and laterally from the chain, as shown. In the machine illustrated two of these chains 11 are provided, the feed belt 2 being extended between and parallel with the chains and said chains being disposed in alinement with the longitudinal centers of the side belts 7. Belt 2 as well as the upper flights of the chains 11 is preferably flush with the top of the table 1 so that a can or other object deflected laterally from the belt 2 by the deflector 4 will slide readily onto the table 1 and thence onto the chain 11 where it will be engaged by one of the projections 13. Upstanding guards 14 are secured upon the table adjacent the outer sides of the chains 11 and constitute means for preventing cans or other objects from being pushed over and off of the chains 11. These guards 14 extend up to the outer end portions of openings 15 formed in the table 1 between the chains 11 and the belts 7 and which openings are adapted to contain the platforms 16 of the scales forming a part of this apparatus.

The openings 15 are located between and close to hollow posts 17 supported by the table 1 and additional hollow posts 18 are supported by the table close to those ends of the guards 14 remote from the openings 15. These posts 17 and 18 support a superstructure 19 on which the greater portion of the mechanism of the machine is mounted.

In the machine illustrated, two units are provided, each unit including a conveying chain, a weighing platform, and mechanism for automatically discarding cans that are under weight. It is therefore necessary only to describe one of these units in order to convey a full understanding of the mechanism.

Journaled in the superstructure 19 and depending therefrom to a point adjacent the front or receiving end of chain 11 is a spindle 20 provided at its lower end with radial arms 21 the free ends of which are bent in the direction of rotation as shown at 22. The upper end of the spindle is provided with ratchet teeth 23 normally bearing against a dog 24 fulcrumed upon a bracket 25 on the superstructure 19, the active end of the dog being yieldingly pressed against the toothed end of the spindle by a spring 26. The inner end of the dog 24 is beveled, as shown at 27 and is adapted to be engaged by a trip 28 pivotally connected to and revoluble with a collar 29 upon a transverse shaft 30 journaled on the superstructure 19. The tripping device 28 has its projecting or active end rounded as shown, while its inner end is designed normally to bear against the shaft 30. Thus when the shaft is rotated in one direction, the convex face of the tripping device 28 will wipe along the beveled end 27 of dog 24 and depress said end so as thus to lift the dog out of engagement with the ratchet teeth 23. When, however, the shaft 30 is rotated in the opposite direction, the outwardly projecting end of the tripping device 28 will swing inwardly toward shaft 30 and ride over the beveled end 27 of the dog 24 without actuating said dog.

From the foregoing it will be apparent that during the rocking of shaft 30, the dog 24 will be successively raised from and lowered into engagement with the ratchet teeth 23.

A crank arm 31 is secured to and rotates with the shaft 30 and is connected, by a rod 32, to one end of a lever 33 fulcrumed under the table 1, the said rod 32 extending downwardly within one of the posts 18. The other end of the lever 33 has a lateral projection or roller 34 designed to ride within a cam groove 35 formed in one face of a disk 36 which rotates with the drive shaft 9. Thus it will be seen that during the rotation of shaft 9 and disk 36, arm 31 will be oscillated so as to rock the shaft 30 and cause the dog 24 to be successively raised and lowered at its active or ratchet engaging end. The cam disk 36 is so shaped and proportioned as to release the ratchet 23 in properly timed relation to the movement of chain 11 so that, after one of the projections 13 has moved into engagement with a can or the like, the spindle 20 will be free to rotate under the pressure exerted thereagainst by another can fed thereto by the belt 2, this resulting in the can arriving in position to be engaged by the next projection 13 on the chain 11.

A bracket 37 is mounted on the superstructure 19 and fulcrumed therein is a balance lever 38 provided at one end with a cross head 39 while its other end is adapted to swing upwardly and downwardly under a stop ear 40 extending from a post 41 on the superstructure 19. This lever is provided upon that arm thereof remote from cross head 39, with an adjustable weight 42 and extending from the weight toward the free end of said arm of the lever is a screw threaded stem 43 having weights 44 screwed thereon, these weights being adjustable to any desired points on the stem 43 and acting as lock nuts when brought tight together, whereby accidental displacement of the weights 44 upon the stem 43 is prevented. Obviously by means of a balance lever mounted in the manner described, a minute adjustment of the scales can be effected.

A rod 45 extends downwardly from the head 39 and through one of the posts 17, the lower end of this rod being bent laterally and upwardly and having one of the platforms 16 secured to it.

Extending downwardly from the stop ear 40 and parallel with the post 41 are guide rods 46 on which is mounted a stop block 47 having a beveled lower end as shown at 48. The free end of lever 38 projects between the ear 40 and the block 47 as shown particularly in Fig. 4.

A crank arm 49 is secured to and rotates with the shaft 30 and is connected by a pitman 50 to a wedging block 51 slidably mounted on the superstructure 19 and movable into position under block 47 so as to engage the beveled end 48 and hold said block 47 in elevated position with the end of lever 38 pressed against the ear 40. Wedging block 51 has a stem 52 extending therefrom and guided within a bracket 53.

Pivotally mounted on one side of the block 51 is a dog 54 having a hook 55 pivotally connected thereto close to its free end, this hook normally engaging a lug 56 extending laterally from the block 51, the dog 54 and the lug 56 being preferably arranged upon a side plate 57 secured to the block 51. A finger 58 is secured to the superstructure 19 and extends above the block 51 and dog 54 and constitutes means for engaging the hook 55 and lifting it into engagement with the lug 56 should said hook be out of engagement during the movement of the block 51 in one direction. A bracket 60 is mounted on the superstructure and carries a spring 61 designed to engage the free end of the dog 54 and assist in moving it downwardly when the hook 55 becomes disengaged from the lug 56.

A tripping ear 62 is arranged upon one side of the lever 38 and is so positioned that, when said end of the lever is swung downwardly, the ear will strike the hook 55 and swing it backwardly out of engagement with the lug 56.

Journaled within the superstructure 19 is a vertical shaft 63 extending close to the inner end portion of the platform 16 and provided, at its lower end, with a switching or deflecting finger 64. The upper end of the shaft 63 has a crank arm 65 connected by a pitman 66 to one end of a lever 67 which is fulcrumed on the superstructure 19. A spring 68 bears against lever 67 so as to hold it normally in one position and to hold the shaft 63 with its deflecting finger or switch 64 substantially parallel with the side edges of the belt 5. A rod 69 is pivotally connected to lever 67 and slidably mounted within a guide 70, this rod being provided at its free end, with a laterally extending projection 71 resting on the superstructure 19 and in the path of the dog 54 when said dog is released and riding upon the superstructure 19.

Deflecting wings 72 are supported above the belts 7 and diverge toward the platforms 16. During the continuous rotation of the main drive shaft 9, the belts 2, 5 and 7 and the chains 11 are continuously driven. Likewise the constantly rotating cam disk 36 is continuously rocking shaft 30 in the manner hereinbefore described so that the ratchet teeth 23 will be intermittently held and released. The filled cans to be weighed are placed on the belt 2 in parallel rows, the partition 3 extending between the rows. These cams are brought forwardly and the first one in each row is brought against the inwardly extending finger 21 in the path thereof but this finger will be held against rotation until one of the projections 13 on the adjacent chain 11 is brought into proper position to engage a new can supplied to the chain 11. As soon as the projection 13 arrives in this position, the dog 24 will be lifted out of engagement with tooth 23 and, consequently, the can on the belt 2 will push against the finger 21 in the path thereof and cause the stem 20 to rotate, thereby bringing one of the cans in position above the chain 11, the deflector 4 serving to shift the can laterally off of belt 2 and onto chain 11. In other words, no matter how close together the cans may be on the belt 2, all of the cans will be held back by the fingers 21 until one of the projections 13 arrives in position to properly engage a can whereupon the stem 20 from which the fingers 21 project will be free to rotate under the pressure of the cans thereagainst so that one of the cans will be deflected laterally onto the chain 11. The can assumes a position above chain 11, the projection 13 in rear thereof pushing the can longitudinally of the table 1 and toward the platform 16, the finger 13 wiping downwardly upon the can, thus to push the can completely onto the platform 16 and said can, as it moves onto the platform, serving to push the preceding can off of the platform and onto the moving belt 7.

Under normal conditions the hook 55 is in engagement with the lug 56 and, consequently, the block 51 which is connected by pitman 50 to crank arm 49, will be free to reciprocate without causing the dog 54 to come against the inwardly extending finger 71. During this reciprocation of the block 51, the block 47 will also be reciprocated upwardly and downwardly on the rods 46, the wedging block 51 pushing against the beveled end 48 to raise block 47 and moving away from said beveled end to permit block 47 to move downwardly. When a can of or more than a predetermined weight is pushed onto the platform 16, the weight is transmitted through rod 45 to the head 39 and the free end of balance lever 38 is thus caused to press against the stop ear 40. As another can of full or over-weight is pushed onto the platform 16 and the preceding can pushed off of the platform, the balance lever 38 will continue to remain in normal position with its free end bearing upwardly against the stop ear 40. If, however, a can below weight should be forced onto the platform 16, the weights 42 and 44 will swing the lever 38 downwardly as soon as the wedging block 51 recedes from the block 47 and said block 47 moves downwardly on the rods 46. This downward movement of the lever 38 will result in the trip 62 striking the hook 55 and swinging it back out of engagement with lug 56. Consequently the dog 54 will gravitate onto the superstructure 19 so that, during the forward movement of the wedging block 55 toward block 47 and the consequent elevation of block 47 and restoration of lever 38 to its normal or elevated position, dog 54 will push against the finger 71. Thus rod 69 will pull on lever 67 and, through pitman 66 on the crank arm 65. This will cause the shaft 63 to rotate and the switch or deflecting finger 64 will swing to the position indicated by dotted lines in Fig. 3. Therefore, when another can is pushed onto the platform 16 and the under weight can is pushed off of the platform and onto the belt 7, finger or switch 64 will deflect said can laterally so that, as it moves outwardly with the belt 7, it will pass the end of the deflector 72 and continue along the belt 7. Under normal conditions, however, where the cans are of or above a predetermined weight, the switch or finger 64 will not be shifted laterally in the manner described but will remain in the position shown by full lines in Fig. 3 so that as soon as the can of proper weight is discharged onto the belt 7, it will be carried by said belt against the deflector 72 and thence shifted laterally onto the belt 5 which will convey it to points where further canning operations are to be effected.

As soon as the under weight can has been discharged from the platform 16, the lever 38 is restored to its raised position by the elevation of block 47 as hereinbefore described and if the succeeding can on platform 16 is of full weight, said lever will stay in its elevated position during the receding of block 51 and the lowering of block 47. During the receding of block 51, the hook 55 which became disengaged during the forward movement of the block, will come against the finger 58 and said finger will swing the hook upwardly into engagement with the lug 56 so that upon the next forward movement of wedging block 51, the finger 71 and rod 69 will not be actuated.

From the foregoing description it will be seen that cans may be placed promiscuously upon the feeding belt 2 and will be fed in properly timed relation to the chains 11, then weighed and, should any of the cans be found under weight, said under weight cans will be carried onto the table 1 by the belts 7 whereas when the cans are full weight or over weight, they will be directed onto the belt 5 and conveyed to points where the canning operation will be completed.

Under some conditions it is desirable to discard from the machine not only cans that are under weight but also those that are over weight. In order that the present machine may operate properly to discard the over weight cans, a modification may be used such as illustrated in Figs. 9 and 10. In this modified construction, the lever 38 is mounted as hereinbefore described and has the slidable blocks 47 and 51 mounted adjacent thereto, there being a dog 54 shiftable with the block 51 as hereinbefore described. This modified construction differs from that hereinbefore referred to, however, in that the ear 73, which corresponds with the ear 40, does not overhang the end of lever 38 and, consequently, does not constitute a stop therefor. Thus it will be seen that the lever 38 is free to swing upwardly or downwardly out of its normal position without any interference by the ear 73 or the block 47. A supplemental lever 74 is fulcrumed between the sides of bracket 37 and one arm of this lever bears upwardly against one end of the lever 38 while the other end is adapted to bear downwardly against a stop 75. A weight 76 is adjustably mounted on this lever adjacent stop 75, thus to hold said lever 74 normally pressed against the end of lever 38.

Instead of utilizing a hook such as shown at 55 in Figs. 5 and 6, a hook 77 is employed, the same being adapted to engage lug 56, and being provided, beyond its upper end, with a head 78 connected to the hook by a laterally extended bridging member 79. A tripping ear 80 corresponding with the ear 62 hereinbefore referred to is secured to lever 38 and works between the upper end of hook 77 and the head 78, but, during the descent of the ear 80 it will strike the upper end of hook 77 and throw said hook backwardly out of engagement with lug 56, and, during the ascent of the said ear 80 it will strike the lower end of the head 78 and again shift the hook 77 out of engagement with lug 56. In this modified construction the same means, such as finger 58, is to be employed for resetting the hook 77, as has been illustrated in the preferred embodiment of the invention.

For the purpose of gripping lever 38 while a can is being placed in position on the scales, a hook 81 is secured to shaft 30 so as to rotate therewith, this hook being so shaped and proportioned as to move to position over the post 41 and ear 73 so as to assume a position upon the upper portion of lever 38 while block 47 is pressing upwardly against the lever. Thus the lever will be gripped as efficiently as in the previously described structure wherein said lever is held at certain times between the block 47 and the ear 40.

In using the modified structure herein described, it may be assumed, for example, that all cans weighing more than ¼ ounce in excess of a predetermined quantity are to be discarded. Under these conditions the weights on the beam 38 are adjusted to indicate the predetermined quantity, after which the weight 76 is adjusted on its lever 74 to indicate the excess quantity to be allowed, the said weight 76 causing the lever 74 to push upwardly against the end of lever 38. Shaft 30 is actuated as before described and each time the block 47 ascends under the action of the sliding block 51, the hook 81 moves over the post 41 so as to grip the end of lever 38 between said hook 81 and the block 47. While the lever is thus held, the can is placed on the scales as hereinbefore described and, when the lever is released it will either remain balanced or practically balanced or else will swing downwardly because of an under weight can or swing upwardly should the weight of the can be sufficient to overbalance lever 38 and the supplemental weight 76. Should the lever 38 swing downwardly, hook 77 will be disengaged from lug 56 by ear 80 moving downwardly into contact with the hook as described in connection with the apparatus shown in Figs. 1 to 8 inclusive. Should the lever 38 swing upwardly under the action of an over weight can, the ear 80 will strike the head 78 and likewise disengage hook 77 from lug 56. In either event, the can when delivered from the scales will be discarded in the manner hereinbefore described by the actuation of the deflecting finger or switch 64.

What is claimed is:—

1. The combination with weighing mechanism including a platform, and means for supplying an article to the platform, of a side belt for receiving an article from the platform, a separate delivering belt, a fixed deflector for directing articles from the side belt and onto the delivery belt, said side and delivery belts being parallel, a switch, and means operated by the weighing mechanism when subjected to other than a predetermined weight, for shifting the switch to deflect the article laterally out of its normal position on the side belt, thereby to pass the fixed deflector without engagement therewith.

2. The combination with weighing mechanism including a platform, means for supplying articles one at a time to the platform, each article constituting means for pushing the preceding article from the platform, a delivering belt, a separate side belt parallel with the delivering belt, for receiving the articles when traveling in their normal course from the platform, and a fixed deflector for directing said articles from the side belt to the delivering belt, of a switch, and means operated by the weighing mechanism when the platform is subjected to other than a predetermined weight, for shifting the switch and deflecting the articles out of their normal paths when discharged from the platform, thereby to pass the fixed deflector without engagement therewith.

3. In a weighing machine, the combination with weighing mechanism including a balanced lever and a platform connected to the lever, of means for limiting the upward movement of the weighted end of the balanced lever, a block, means for moving said block into and out of engagement with the lower portion of the balanced lever during the weighing operation, thereby to momentarily support said lever in its raised or overbalanced position, a switch adjacent the platform, a normally inactive dog movable in unison with the block, and means operated by the balanced lever when moved, for releasing the dog to actuate the switch.

4. In a weighing machine, the combination with a weighted balanced lever and a platform connected thereto, of a stop for limiting the upward movement of the balanced lever, a block movable intermittently into engagement with the lower portion of the balanced lever to hold it intermittently against its stop, a dog movable in unison with said block, means for holding the dog in inactive position, means operated by the movement of the balanced lever for releasing the dog, a normally inactive switch adjacent the platform, and means operated by the released dog for shifting the switch into position to deflect out of its normal path an under-weight article delivered from the platform.

5. In a weighing machine, the combination with a balanced lever and a platform connected thereto, of a stop for limiting the upward movement of the lever, a block under the lever, a wedging element mounted for reciprocation and constituting means for raising and lowering the block during such reciprocation thereby to lift the lever against its stop, a dog movable with the wedging element, means for normally supporting the dog out of active position, means operated by the movement of the balanced lever for releasing the dog, a switch, and means operated by the released dog during the reciprocation of the wedging element for shifting the switch.

6. In a weighing machine, the combination with a balanced lever and a platform connected thereto, of a stop for limiting the upward movement of the lever, a block under the lever, a wedging element mounted for reciprocation and constituting means for raising and lowering the block during such reciprocation thereby to lift the lever against its stop, a dog movable with the wedging element, means for normally supporting the dog out of active position, means operated by the movement of the balanced lever for releasing the dog, a switch, means operated by the released dog during the reciprocation of the wedging element for shifting the switch, and means for resetting the dog during the reciprocation of the wedging element.

7. In a weighing machine, the combination with a balanced lever and a platform connected to the lever, of a continuously operating rock shaft, a stop for limiting the upward movement of the balanced lever, means operated by the rock shaft for successively pressing the lever against the stop and releasing said lever to permit downward movement thereof, a dog shiftable with said means, and means for holding the dog normally set or inactive, means operated by the balanced lever during its movement for releasing the dog, a switch adjacent the platform, means operated by the released dog for actuating the switch.

8. In a weighing machine, the combination with a balanced lever and a platform connected to the lever, of a continuously operating rock shaft, a stop for limiting the upward movement of the balanced lever, means operated by the rock shaft for successively pressing the lever against the stop and releasing said lever to permit downward movement thereof, a dog shiftable with said means, means for holding the dog normally set or inactive, means operated by the balanced lever during its movement for releasing the dog, a switch adjacent the platform, means operated by the released dog for actuating the switch, and fixed means adjacent the dog for resetting the dog and disengaging it from the switch operating means.

9. In a weighing machine, the combination with a lever and a platform connected to the lever, of a continuously operating rock shaft, a stop for limiting the upward movement of the lever, means operated by the rock shaft for successively pressing the lever against the stop and releasing said lever to permit downward movement thereof, a dog shiftable with said means, means for holding the dog normally set or inactive, means operated by the lever during either its upward or downward movement for releasing the dog, a shifting switch, and means operated by the released dog for actuating the switch.

In testimony that I claim the foregoing as my own, I have hereto affixed my signature in the presence of two witnesses.

ARTHUR Y. SEELY.

Witnesses:
ANNA SCOTT,
JNO. J. PINCKNEY.